(12) United States Patent
Dang et al.

(10) Patent No.: US 12,273,737 B2
(45) Date of Patent: Apr. 8, 2025

(54) TERRESTRIAL OR NON-TERRESTRIAL WIRELESS COMMUNICATION SYSTEMS

(71) Applicant: Fraunhofer-Gesellschaft zur Förderung der angewandten Forschung e.V., Munich (DE)

(72) Inventors: Thi Uyen Ly Dang, Erlangen (DE); Thomas Heyn, Erlangen (DE); Alexander Hofmann, Erlangen (DE); Leszek Raschkowski, Berlin (DE); Thomas Fehrenbach, Berlin (DE); Stephan Jaeckel, Berlin (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 419 days.

(21) Appl. No.: 17/242,101

(22) Filed: Apr. 27, 2021

(65) Prior Publication Data

US 2021/0250781 A1    Aug. 12, 2021

Related U.S. Application Data

(63) Continuation of application No. PCT/EP2019/079930, filed on Oct. 31, 2019.

(30) Foreign Application Priority Data

Nov. 2, 2018 (EP) .................................... 18204184
Oct. 21, 2019 (EP) .................................... 19204308

(51) Int. Cl.
*H04B 7/185* (2006.01)
*H04B 7/0408* (2017.01)
(Continued)

(52) U.S. Cl.
CPC .......... *H04W 16/28* (2013.01); *H04B 7/0408* (2013.01); *H04B 7/18515* (2013.01); *H04W 64/00* (2013.01); *H04W 84/06* (2013.01)

(58) Field of Classification Search
CPC ..... H04W 16/28; H04W 64/00; H04W 84/06; H04B 7/0408; H04B 7/18515; H04B 7/2041

See application file for complete search history.

(56) References Cited

U.S. PATENT DOCUMENTS 5,483,664 A * 1/1996 Moritz ............... H04B 7/18541
455/12.1
6,108,538 A * 8/2000 Blasiak ............. H04B 7/18541
455/12.1

(Continued)

FOREIGN PATENT DOCUMENTS

CN    101536560 A    6/2013
CN    106031211 A    10/2016

(Continued)

OTHER PUBLICATIONS

Office Action dated Feb. 11, 2022 issued in the parallel Indian patent application No. 202117019180 (6 pages).

(Continued)

*Primary Examiner* — Stephen M D Agosta
(74) *Attorney, Agent, or Firm* — Haynes and Boone, LLP

(57) ABSTRACT

A wireless communication system including: at least a first terrestrial or non-terrestrial base station, the first base station configured to generate one or more beams for covering at least a first beam coverage area; wherein the first base station is configured to broadcast at least to the first beam coverage area a list of tracking area IDs including a first tracking area ID belonging to a first tracking region and a second tracking area ID belonging to a second tracking region.

18 Claims, 10 Drawing Sheets

(51) Int. Cl.
  *H04W 16/28* (2009.01)
  *H04W 64/00* (2009.01)
  *H04W 84/06* (2009.01)

(56) References Cited

U.S. PATENT DOCUMENTS

| | | | | |
|---|---|---|---|---|
| 6,272,345 | B1* | 8/2001 | Worger | H04B 7/18541 |
| | | | | 455/430 |
| 6,321,088 | B1* | 11/2001 | Dempo | H04B 7/18541 |
| | | | | 455/13.1 |
| 6,823,170 | B1* | 11/2004 | Dent | H04B 7/18515 |
| | | | | 455/430 |
| 8,983,496 | B1* | 3/2015 | Vivanco | H04W 4/02 |
| | | | | 455/456.1 |
| 9,137,768 | B1* | 9/2015 | Singh | H04W 60/00 |
| 9,699,624 | B1* | 7/2017 | Huang | H04W 68/005 |
| 9,888,455 | B1* | 2/2018 | Laslo-Amit | B61L 25/02 |
| 9,913,242 | B1* | 3/2018 | Saleh | H04W 60/02 |
| 9,973,268 | B1* | 5/2018 | Husted | H04W 56/0025 |
| 10,177,837 | B2* | 1/2019 | Ravishankar | H04B 7/18513 |
| 2002/0146979 | A1* | 10/2002 | Regulinski | H04B 7/18513 |
| | | | | 455/430 |
| 2004/0029545 | A1* | 2/2004 | Anderson | H04W 56/0035 |
| | | | | 455/161.1 |
| 2004/0114552 | A1* | 6/2004 | Lim | H04B 7/2041 |
| | | | | 370/324 |
| 2004/0192200 | A1* | 9/2004 | Karabinis | H04W 52/42 |
| | | | | 455/12.1 |
| 2005/0111480 | A1* | 5/2005 | Martin | H04B 7/18589 |
| | | | | 370/461 |
| 2007/0230391 | A1* | 10/2007 | Harpak | H01Q 1/428 |
| | | | | 370/316 |
| 2009/0131046 | A1* | 5/2009 | Karabinis | H04B 7/18563 |
| | | | | 455/427 |
| 2010/0048224 | A1* | 2/2010 | Klatt | H04W 16/18 |
| | | | | 455/456.1 |
| 2010/0061308 | A1* | 3/2010 | Becker | H04W 60/04 |
| | | | | 370/328 |
| 2010/0128656 | A1* | 5/2010 | Kim | H04W 72/0453 |
| | | | | 370/316 |
| 2011/0053628 | A1* | 3/2011 | Kim | H04B 7/18539 |
| | | | | 455/509 |
| 2011/0110308 | A1* | 5/2011 | Liang | H04W 60/06 |
| | | | | 370/328 |
| 2011/0110350 | A1* | 5/2011 | Lu | H04W 76/20 |
| | | | | 370/338 |
| 2011/0128866 | A1* | 6/2011 | Tian | H04L 1/0025 |
| | | | | 370/252 |
| 2011/0195714 | A1* | 8/2011 | Sawinathan | H04W 60/005 |
| | | | | 455/435.1 |
| 2011/0222589 | A1* | 9/2011 | Howell | H04B 7/18519 |
| | | | | 375/213 |
| 2011/0312370 | A1* | 12/2011 | Kim | H04W 52/0206 |
| | | | | 455/525 |
| 2012/0243465 | A1* | 9/2012 | Wohlford | H04W 88/04 |
| | | | | 370/336 |
| 2013/0044611 | A1* | 2/2013 | Jalali | H04W 16/14 |
| | | | | 370/252 |
| 2013/0077592 | A1* | 3/2013 | Wang | H04W 76/28 |
| | | | | 370/328 |
| 2013/0147652 | A1* | 6/2013 | Haque | G08G 5/0013 |
| | | | | 342/21 |
| 2013/0337797 | A1* | 12/2013 | Ban | H04W 84/00 |
| | | | | 455/422.1 |
| 2013/0344890 | A1 | 12/2013 | Hahn et al. | |
| 2015/0003314 | A1* | 1/2015 | Kim | H04W 28/08 |
| | | | | 370/312 |
| 2015/0063201 | A1* | 3/2015 | Kim | H04B 7/0617 |
| | | | | 370/316 |
| 2015/0063203 | A1* | 3/2015 | Kim | H04B 7/0408 |
| | | | | 370/326 |
| 2015/0079977 | A1* | 3/2015 | Park | H04B 7/18513 |
| | | | | 455/12.1 |
| 2015/0094056 | A1* | 4/2015 | Oh | H04B 7/18515 |
| | | | | 455/430 |
| 2015/0148062 | A1* | 5/2015 | Chen | H04W 64/003 |
| | | | | 455/456.1 |
| 2015/0188644 | A1* | 7/2015 | Kang | H04B 7/2041 |
| | | | | 455/12.1 |
| 2015/0281966 | A1* | 10/2015 | Griot | H04W 12/06 |
| | | | | 726/5 |
| 2016/0006500 | A1* | 1/2016 | Radpour | H04B 7/18539 |
| | | | | 455/427 |
| 2016/0149599 | A1* | 5/2016 | Lindsay | H04B 7/195 |
| | | | | 455/13.1 |
| 2016/0241328 | A1* | 8/2016 | Kang | H04B 7/18539 |
| 2016/0259061 | A1* | 9/2016 | Carter | G01S 19/28 |
| 2016/0345189 | A1* | 11/2016 | Miyagawa | H04W 72/0446 |
| 2016/0365629 | A1* | 12/2016 | Yao | H01Q 1/1257 |
| 2017/0126307 | A1* | 5/2017 | Wyler | H04W 72/0453 |
| 2017/0223690 | A1* | 8/2017 | Zeng | H04W 16/28 |
| 2017/0311247 | A1* | 10/2017 | Qi | H04W 48/18 |
| 2017/0318613 | A1* | 11/2017 | Kuge | H04W 24/04 |
| 2017/0331577 | A1* | 11/2017 | Parkvall | H04W 4/00 |
| 2017/0366251 | A1* | 12/2017 | Ravishankar | H04B 7/18513 |
| 2018/0014212 | A1* | 1/2018 | Oga | H04B 7/18515 |
| 2018/0027522 | A1 | 1/2018 | Lee et al. | |
| 2018/0183511 | A1* | 6/2018 | Oga | H04B 7/208 |
| 2018/0184246 | A1* | 6/2018 | Ryu | H04W 68/06 |
| 2018/0199157 | A1* | 7/2018 | Talluri | H04W 4/06 |
| 2018/0220289 | A1 | 8/2018 | Ryu et al. | |
| 2018/0234943 | A1* | 8/2018 | Zakaria | H04W 68/02 |
| 2018/0316417 | A1* | 11/2018 | Motoyoshi | H04B 7/18523 |
| 2018/0367953 | A1* | 12/2018 | Shimizu | H04W 4/029 |
| 2019/0028570 | A1* | 1/2019 | Coleman | H04W 84/06 |
| 2019/0041526 | A1* | 2/2019 | Lucky | G01S 19/27 |
| 2019/0053192 | A1* | 2/2019 | Rune | H04W 60/00 |
| 2019/0082481 | A1* | 3/2019 | Ravishankar | H04W 76/10 |
| 2019/0090141 | A1* | 3/2019 | Fujii | H04W 16/14 |
| 2019/0245614 | A1* | 8/2019 | Lucky | H04W 36/0061 |
| 2019/0319686 | A1* | 10/2019 | Chen, IV | H04B 7/088 |
| 2020/0059884 | A1* | 2/2020 | Chen | H04W 4/02 |
| 2020/0178206 | A1* | 6/2020 | Turtinen | H04W 64/003 |
| 2020/0322904 | A1* | 10/2020 | Hou | H04L 69/28 |
| 2020/0329439 | A1* | 10/2020 | Byun | H04W 64/006 |
| 2021/0144669 | A1* | 5/2021 | Edge | H04W 12/037 |
| 2021/0218467 | A1* | 7/2021 | Jin | H04W 64/003 |
| 2022/0240131 | A1* | 7/2022 | Yang | H04W 28/0268 |

FOREIGN PATENT DOCUMENTS

| | | |
|---|---|---|
| CN | 107409294 A | 11/2017 |
| EP | 3179762 A1 | 6/2017 |
| EP | 3197186 A1 | 7/2017 |
| KR | 20140072665 A | 6/2014 |
| WO | WO 2020/063497 A1 | 4/2020 |
| WO | WO 2020/064651 A1 | 4/2020 |
| WO | WO 2020/091647 A1 | 5/2020 |

OTHER PUBLICATIONS

3GPP TS 23.501 V15.3.0 (Sep. 2018).
3GPP TS 38.300 V15.3.1 (Oct. 2018); Technical Specification Group Radio Access Network; NR; NR and NG-RAN Overall Description Stage 2 (Release 15).
3GPP TS 38.331 V15.3.0 (Sep. 2018); Technical Specification Group Radio Access Network; NR; Radio Resource Control (RRC) protocol specification (Release 15),.
3GPP TR 38.811 V15.0.0 Jun. 2018); Study on New Radio (NR) to support non-terrestrial networks.
3rd Generation Partnership Project; Technical Specification Group Core Network and Terminals; Numbering, addressing and identification (Release 15), 3GPP Standard; Technical Specification; 3GPP TS 23.003, 3RD Generation Partnership Project (3GPP), Mobile Competence Centre; 650, Route Des Lucioles; F-06921 Sophia-Antipolis Cedex ; FRANCE, vol. CT WG4, No. V15.5.0, Sep. 24, 2018 (Sep. 24, 2018), pp. 1-128, XP051487292, [retrieved on Sep. 24, 2018].
Huawei et al: "Discussion on 5G TAC broadcasted in SI", 3GPP Draft; R2-1802516 Discussion On 5G TAC Broadcasted in SI, 3rd

(56) References Cited

OTHER PUBLICATIONS

Generation Partnership Project (3GPP), Mobile Competence Centre ; 650, Route Des Lucioles ; F-06921 Sophia-Antipolis Cedex ; FRANCE vol. RAN WG2, No. Athens, Greece; Feb. 26, 2018-Mar. 2, 2018 Feb. 14, 2018 (Feb. 14, 2018), XP051399229, Retrieved from the Internet: URL:http://www.3gpp.org/ftp/tsg%5Fran/WG2%5FRL2/TSGR2%5F101/Docs/ [retrieved on Feb. 14, 2018].
Mitsubishi Electric RCE, R3-186002 Tracking Areas with Non Terrestrial Networks 3GPP TSG RAN \wg3_iu, tsgr3_101bis NTN, Sep. 29, 2018 3GPP TSG RAN WG3 Meeting #101bis R3-186002, Oct. 8-12, 2018, Chengdu (China).
Office Action of Chinese Patent Application No. 201980072694.0 dated Dec. 22, 2023 (20 pages).

\* cited by examiner

TERRESTRIAL OR NON-TERRESTRIAL WIRELESS COMMUNICATION SYSTEMS

CROSS-REFERENCES TO RELATED APPLICATIONS

This application is a continuation of copending International Application No. PCT/EP2019/079930, filed Oct. 31, 2019, which is incorporated herein by reference in its entirety, and additionally claims priority from European Applications Nos. 18 204 184.8, filed Nov. 2, 2018, and EP 19 204 308.1, filed Oct. 21, 2019, all of which are incorporated herein by reference in their entirety.

BACKGROUND OF THE INVENTION

Embodiments of the present invention refer to a wireless communication system, to a cell network controller for a wireless communication system and to a user equipment. Further embodiments refer to a method for localization management and the respective computer program. Preferred embodiments refer to an approach for localization management/tracking area management for non-terrestrial networks. In general, embodiments of the present invention are applied in connection with non-terrestrial networks, like satellite networks or other non-terrestrial networks, e.g. being based on high-altitude platforms.

Location management (LM) is a function of mobile cellular networks, which allows the network to locate the user. Especially when the UE is not active, this function ensures the knowledge of the rough position of the UE to establish the connection for an incoming call to the UE (paging), if needed.

Before discussing localization management, especially localization management approaches in the context of GSM or UMTS, the principal structure of a terrestrial network and a non-terrestrial network will be discussed.

FIG. 8 below is a schematic representation of an example of a terrestrial wireless network 100 including a core network 102 and a radio access network 104.

The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 8a shows an exemplary view of only five cells, however, the wireless communication system may include more such cells. FIG. 8a shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 8a shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 8a by the arrows pointing to "core". The core network 102 may be connected to one or more external networks. Further, some or all of the respective base station $gNB_1$ to $gNB_5$ may connected, e.g. via the S1 or X2 interface or Xn interface in NR, with each other via respective backhaul links $116_1$ to $116_5$, which are schematically represented in FIG. 8 by the arrows pointing to "gNBs". The wireless network or communication system depicted in FIG. 8a may by a heterogeneous network having two distinct overlaid networks, a network of macro cells with each macro cell including a macro base station, like base station $gNB_1$ to $gNB_5$, and a network of small cell base stations (not shown in FIG. 8a), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the 4G LTE, 4.5G LTE-Advanced pro or the 5G NR, New Radio, standard.

In the wireless communication network as shown in FIG. 8a the radio access network 104 may be a heterogeneous network including a network of primary cells, each including a primary base station, also referred to as a macro base station. Further, a plurality of secondary base stations, also referred to as small cell base stations, may be provided for each of the macro cells.

In addition to the above described terrestrial wireless network also non-terrestrial wireless communication networks exist. FIG. 8b below is a schematic representation of an example of a non-terrestrial wireless communication network 150 including a core network 152 and a radio access network 154. Other than the terrestrial wireless network of FIG. 8b, the non-terrestrial wireless network 150 includes a plurality of transceivers 156, like satellites, and/or airborne transceivers 158, like unmanned aircraft systems. The respective or airborne transceivers 156, 158 may be implemented in respective space borne or airborne vehicles, like the above mentioned satellites or unmanned aircraft systems. The transceivers 156 and 158 are provided to serve one or more users, like the UE or the IoT device 110 shown in FIG. 8b, which are provided on or above ground 160. The UE and the IoT device may be devices as described above with reference to FIG. 8a. The arrows $158_1$ to $158_4$ schematically represent uplink/downlink connections for communicating data between the user UE, 110 and the respective transceiver 156, 158. The transceivers 156, 158 are connected to the core network 152 as is schematically represented by the arrows $162_1$, $162_2$. The above described non-terrestrial wireless communication network or system may operate in a similar way as the terrestrial system described above with reference to FIG. 8a, for example in accordance with the 4G LTE, 4.5G LTE-advanced pro or the 5G NR, new radio, standard.

Data communicated between the users UE, 110 and the transceivers 106, 156, 158 of the above described communication networks may be overlaid with noise while being transmitted over the channel 108, 112, 158 so that the data may not be processed correctly or may not be processed at all at the receiver. For example, when the data to be transmitted is encoded using a predefined code, the encoded data is generated at the transmitter and forwarded to the receiver over the channel. During the transmission, the encoded data may be overlaid with noise to such an extent that decoding of the encoded data is not possible, e.g., because of noisy channel situations. To address such a situation, a retransmission mechanism may be employed. For example, when the receiver detects that the encoded data cannot be decoded, a retransmission from the transmitter or sender is requested. For example, a hybrid automatic repeat request, HARQ, may be used to request a retransmission from the transmitter, like the UE, to correct decoding failures. At the transmitter, encoding the data includes generating redundancy that may include redundant bits that are added to the data to be transmitted. During a first transmission only a part of the redundancy may be transmitted. When a retransmission is requested, further parts of the redundancy, also referred to as additional or incremental redundancy, may be send to the receiver. For example, HARQ may employ chase combining (every re-transmission contains the same information—data and parity bits), or incremental redundancy (every re-transmission contains different parity bits than the previous one). The retransmission, however, causes a delay due to the additional round-trip time (RTT) which includes the propagation delays over the network and the processing delays at the UE and the receiver.

It is noted that the information in the above section is only for enhancing the understanding of the background of the invention and therefore it may contain information that does not form the known technology that is already known to a person of ordinary skill in the art.

The demand for (worldwide) connectivity is dramatically increasing due to a rising number of different services and data demands in a more and more connected world. This also includes connectivity anytime and everywhere. Even if the number of connected areas around the world dramatically increases, it will not be possible to serve every spot on the entire earth (underserved areas, maritime, planes, etc.) by stationary/terrestrial cellular networks.

In order to support these needs, cellular networks need to be supported by non-stationary networks as well. These networks could consist of e.g. drones, airplanes, high altitude platforms, low earth orbit satellites, medium earth orbit satellites. By adding non-stationary base stations to the networks of the future the coverage and also the reliability could be easily and dramatically enhanced, which may be used for many future services and applications.

(Connectivity between all these different types of platforms may be used to support the quality of service (QoS) needs and to ensure service sustainability, e.g. in disaster relief situations)

An objective of the present invention is to provide a concept for localization management to be applied to non-stationary networks, e.g. satellite networks.

SUMMARY

According to an embodiment, a wireless communication system may have: at least a first moving transmission point, the first moving transmission point configured to generate one or more beams for covering temporarily at least a first beam coverage area which is dynamically arranged to ground and which is subdivided into a first tracking region and a second tracking region; wherein the first moving transmission point is configured to broadcast at least to the first beam coverage area a list of tracking area IDs including a first tracking area ID belonging to the first tracking region and a second tracking area ID belonging to the second tracking region; wherein the list of tracking area IDs is updated from time to time, namely when the first tracking region and the second tracking region are not covered or served anymore by the first beam coverage area or when a third tracking region is covered or served by the first beam coverage area.

According to another embodiment, a wireless communication system may have: at least a first moving transmission point, the first moving transmission point configured to generate one or more beams for covering temporarily at least a first beam coverage area configured to generate one or more beams for covering temporarily at least a first beam coverage area which is dynamically arranged to ground and which is subdivided into a first tracking region and a second tracking region; wherein the first moving transmission point is configured to broadcast at least to the first beam coverage area a list of tracking area IDs including a first tracking area ID belonging to the first tracking region and a second tracking area ID belonging to the second tracking region just during a limited predetermined first time period; wherein the list of tracking area IDs is updated from time to time, namely when the first tracking region and the second tracking region are not covered or served anymore by the first beam coverage area or when a third tracking region is covered or served by the first beam coverage area.

Another embodiment may have a core network controller for the inventive wireless communication system, which is configured to control the first moving transmission point with regard to the broadcasted tracking area ID, with regard to the list of broadcasted tracking area IDs, with regard to adapting the broadcasted tracking area ID and/or with regard to adapting the list of tracking area IDs.

Another embodiment may have a core network controller for the wireless communication system configured to route paging messages to the one or more moving transmission points selected for currently broadcasting using one or more beams the first tracking area ID if the paging message is dedicated to a user equipment within the first tracking region and/or to the one or more moving transmission points selected for currently broadcasting using one or more beams the second tracking area ID if the paging message is dedicated to a user equipment within the second tracking region.

Another embodiment may have a user equipment for the inventive wireless communication system, which is configured to receive the coverage beam and the list broadcasted using the coverage beam and to determine its tracking region by comparing a tracking area ID assigned to the user equipment with the tracking area IDs included in the list.

According to another embodiment, a method for location management may have the steps of: broadcasting at least to the first beam coverage area—using a first non-terrestrial moving transmission point, the first moving transmission point generating one or more beams for temporarily covering a first beam coverage area which is dynamically arranged to ground and which is subdivided into a first tracking region and a second tracking region—a list of tracking area IDs including a first tracking area ID belonging to a first tracking region and a second tracking area ID belonging to a second tracking region; and updating the list of tracking area IDs from time to time, namely when the first tracking region and the second tracking region are not covered or served anymore by the first beam coverage area or when a third tracking region is covered or served by the first beam coverage area.

According to another embodiment, a method for location management may have the steps of: broadcasting at least to the first beam coverage area—using a first non-terrestrial moving transmission point, the first moving transmission point generating one or more beams for covering temporarily a first beam coverage area which is dynamically arranged to ground and which is subdivided into a first tracking region and a second tracking region (12b)—a list of tracking area IDs including a first tracking area ID belonging to the first tracking region and a second tracking area ID belonging to the second tracking region just during a limited predetermined first time period; and/or broadcasting at least to the second beam coverage area—using a second non-terrestrial moving transmission point, the second moving transmission point generating one or more beams for covering temporarily a second beam coverage area—another list of tracking area IDs including the first tracking area ID belonging to the first tracking region just during a limited predetermined second time period subsequent to the first time period; and updating the list of tracking area IDs from time to time, namely when the first tracking region and the second tracking region are not covered or served anymore by the first beam coverage area or when a third tracking region is covered or served by the first beam coverage area.

Another embodiment may have a non-transitory digital storage medium having a computer program stored thereon to perform the method for location management, the method having the steps of: broadcasting at least to the first beam coverage area—using a first non-terrestrial moving transmission point, the first moving transmission point generating one or more beams for temporarily covering a first beam coverage area which is dynamically arranged to ground and which is subdivided into a first tracking region and a second tracking region—a list of tracking area IDs including a first tracking area ID belonging to a first tracking region and a second tracking area ID belonging to a second tracking region; and updating the list of tracking area IDs from time to time, namely when the first tracking region and the second tracking region are not covered or served anymore by the first beam coverage area or when a third tracking region is covered or served by the first beam coverage area, when said computer program is run by a computer.

Another embodiment may have a non-transitory digital storage medium having a computer program stored thereon to perform the method for location management, the method having the steps of: broadcasting at least to the first beam coverage area—using a first non-terrestrial moving transmission point, the first moving transmission point generating one or more beams for covering temporarily a first beam coverage area which is dynamically arranged to ground and which is subdivided into a first tracking region and a second tracking region (12b)—a list of tracking area IDs including a first tracking area ID belonging to the first tracking region and a second tracking area ID belonging to the second tracking region just during a limited predetermined first time period; and/or broadcasting at least to the second beam coverage area—using a second non-terrestrial moving transmission point, the second moving transmission point generating one or more beams for covering temporarily a second beam coverage area—another list of tracking area IDs including the first tracking area ID belonging to the first tracking region just during a limited predetermined second time period subsequent to the first time period; and updating the list of tracking area IDs from time to time, namely when the first tracking region and the second tracking region are not covered or served anymore by the first beam coverage area or when a third tracking region is covered or served by the first beam coverage area, when said computer program is run by a computer.

BRIEF DESCRIPTION OF THE DRAWINGS

Embodiments of the present invention will be detailed subsequently referring to the appended drawings, in which:

FIG. 5a, 5b show schematic representations of a solution using country areas as exemplary tracking areas, wherein FIG. 5a shows a first of two exemplary time instances, in FIG. 5b a respective second; to illustrate enhanced embodiments;

DETAILED DESCRIPTION OF THE INVENTION

Below, identical reference numbers are provided to objects having identical functions so that the description thereof is mutually applicable and interchangeable.

Before discussing embodiments of the present invention, the background of the present invention, especially different approaches for localization management will be discussed.

Localization management is used to ensure a rough position determination of a UE. Regardless of the particular location management approach, in general, LM is based on defining specific areas (AR), in which the UE moves freely without updating the network about its current position. In mobile cellular systems this area corresponds typically to a cluster of cells as shown exemplarily in FIG. 1. The sizes of the AR can be chosen arbitrarily and are subject to the optimization criterion of the network operator. Note, that the ARs may also be overlapping. In the 3GPP mobile communication systems the ARs are known as:

Location areas in GSM
Routing areas in UMTS
Registration areas in LTE and NR.

Figure 1:
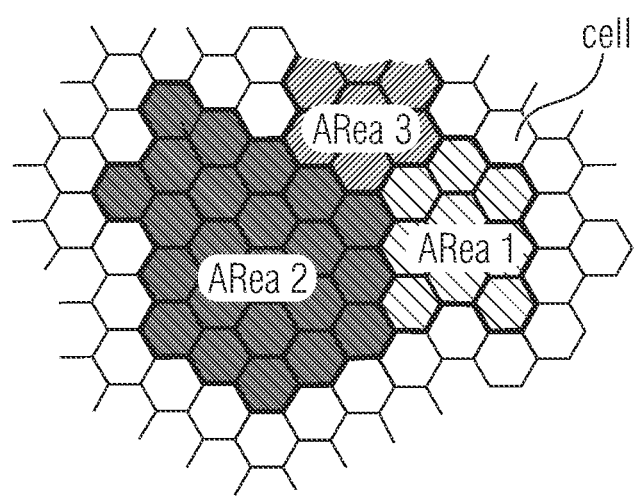
FIG. 1 shows a schematic diagram for illustrating a definition of specific areas for localization management.

Below, briefly two popular localization management techniques will be discussed. One of the two popular LM approaches is, for example, used in GSM and adapts in UMTS. The conventional localization management is a simple approach, which was first widely used in GSM. Here, the different areas, which may comprise the plurality of cells, are referred to as areas (ARs). Please note that the areas ARs which have been discussed in the context of FIG. 1 are, according to the approach of FIG. 2, renamed as localization areas (LA). Thus, according to the conventional approach, which is illustrated by FIG. 2, these areas are referred to as localization areas (LA) without loss of generality.

Figure 2:
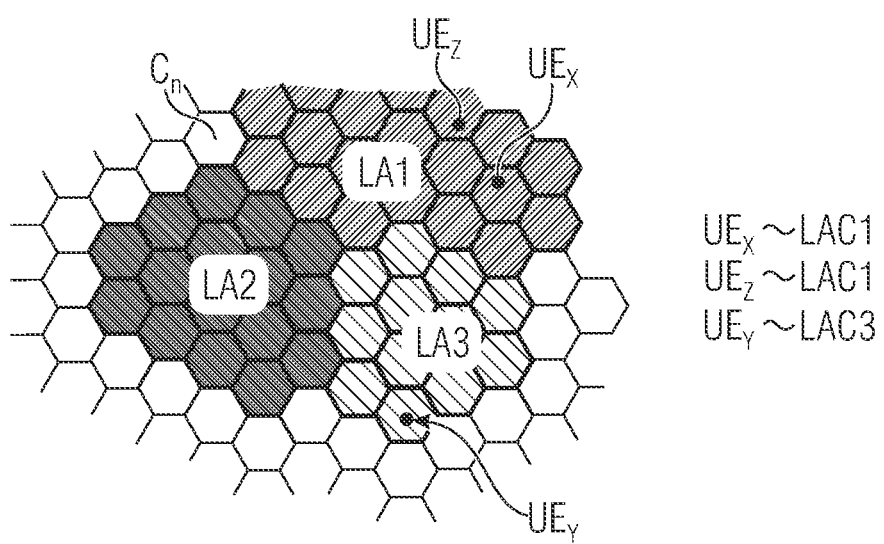
FIG. 2 shows a schematic diagram for illustrating the concept of conventional localization management.

FIG. 2 shows three areas LA1, LA2, LA3, which all may comprise a plurality of cells CO, as illustrated by the cell pattern. Within the different areas some UEs are exemplarily marked. For example, the $UE_z$ is arranged within a cell of LA1, while the $UE_x$ is illustrated in another cell within the same localization area LA1. Another UE is positioned within LA3.

A unique location area code (LAC) is used to address the location area. In cellular networks each base station broadcasts the LAC of the LA it belongs to. The UE obtains at the moment of the registration to the core network (CN) the ID of its current LA. The concept of the conventional location management is shown in FIG. 2. The UE detects by comparing the broadcast LAC with the LAC obtained from the network, if it has left its LA. In this case the UE requests a Location Area Update and the CN registers the LA change and communicates subsequently the LAC of the new LA.

Note, that the UE obtains only one LAC, hence, in principle the conventional location management assigns the UEs to a LA.

Starting from this conventional localization management approach, a list-aided-solution can be used. This was introduced in LTE and extended in NR.

Figure 3:
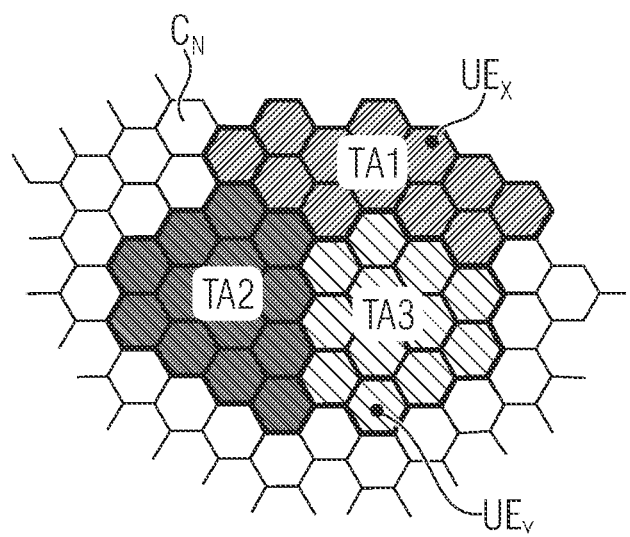
FIG. 3 shows a schematic diagram for the concept of list-based localization management, which is used according to embodiments.
Figure 3:
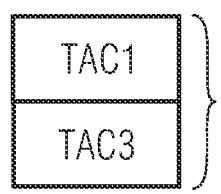
Figure 3:
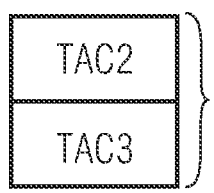

FIG. 3 shows this list-based localization management. Here, the areas AR are renamed for the list-based localization management approach as tracking areas (TA). Background thereof is that in LTE the list-based location management (LM) is employed to enhance effectiveness in location management, where the ARs as seen in FIG. 1 are named tracking areas (TA) without loss of generality.

FIG. 3 shows three tracking areas TA1, TA2 and TA3, wherein each tracking area TA1 to TA3 is formed by a plurality of cells CN. Here two UEs are shown, $UE_x$ being arranged/situated within TA1 and $UE_y$ being arranged within TA3.

After discussing the structure, the concept of list-based localization management will be discussed. Similar to the conventional LM, each tracking area obtains a unique identifier—the tracking area code (TAC), which respectively is broadcast by the base station within the tracking area.

The effective location management is realized by additionally introducing a tracking area list (TAL) for each UE, which contains a variable number of TAC.

The TACs for the TALs are selected by the core network (CN), considering specific UE context.

The area specified by the TAL is referred to as tracking region (TR). The TR is the pendant of the location area in conventional location management, i.e. within the TR, no update of the location needs to be communicated by the UE to the CN.

For example, the CN assigns to $UE_x$ the $TAL_x$ and to $UE_y$ the $TAL_y$, each list containing different TACs and, thus, defining different TRs, respectively. It can be easily seen, that with list-based location management the TR, the region without UE triggered position update, is now variable and depends on the selection of TAL entries.

Similar to conventional LM the UE is able to detect by comparing the TAL and the broadcast TACs, whenever it leaves the assigned TR. This event triggers the UE to request a tracking area update. The CN assigns subsequently a new TAL to the UE.

It is noted that the information in the above sections is only for enhancing the understanding of the background of the invention and therefore it may contain information that does not form known technology and that is already known to a person of ordinary skill in the art. The above-discussed approaches are mainly designed for stationary networks. However, in the context of non-stationary networks the challenge of localization management is connected to the movement of the serving entity such as the satellites. Below, approaches providing a solution for the above concept will be discussed.

Location management of traditional satellite systems rely on the availability of GNSS information. The drawback of this approach is the need for more complexity in the user terminal, which is not always possible or desired. On the other hand, a solution without the need of GNSS information was presented in [4]. Here, the assumption of non-time varying satellite IDs, and dynamic TA lists at the UE form the basis.

In the presence of high mobility (UE/satellite) high signaling work will occur with current terrestrial SotA location management due to frequent location list updates caused by non-stationary base stations. On the other hand, SotA LM solutions of such light systems may use a higher complexity at the user terminal for GNSS capability. Therefore, there is a need for an improved approach.

An embodiment provides a wireless communication system, which comprises at least a first terrestrial or non-terrestrial base station. The first (terrestrial/non-terrestrial) base station is configured to generate one or more beams for covering at least the first beam coverage area. The first base station is configured to broadcast at least to the first beam coverage area a list of tracking area IDs comprising a first tracking area ID and a second area ID. The first tracking area ID belongs to a first tracking region. The second tracking area ID belongs to a second tracking region. Note that according to an example the respective tracking areas (first and second) can be a subset of the first (satellite) beam coverage area.

Embodiments of the present invention are based on the finding that the beam coverage area which can, for example, be dynamically arranged to the ground is subdivided into tracking regions which are (temporarily) covered by the one coverage area. Instead of identifying just the entire beam coverage area, a list of tracking area IDs is broadcasted, wherein this list can be updated from time to time, e.g. when some tracking areas are not covered anymore by the coverage area or new tracking areas are covered by the recent beam. A UE performs tracking by comparing the received tracking area IDs within the list with an information regarding the tracking area IDs aside the real terrestrial areas on ground. This means that it can still track irrespective tracking areas and determine whether it is still covered by the first satellite beam coverage area or the respective tracking area ID is now broadcasted by another satellite. Consequently, the above discussed principle for localization management is still applicable for non-terrestrial base stations or in general the base station having a variable beam coverage area. Due to the partitioning of the one circular beam coverage area into subsets of the beam coverage area it is possible that the partially changed beam coverage can be taken into account.

According to embodiments, the first base station is configured to broadcast at least to the first beam coverage area first tracking area ID belonging to a first tracking region or a list of tracking area IDs comprising a first tracking area ID belonging to the first tracking region, and a second tracking area ID belonging to a second tracking region just during a limited predetermined first time period. This time period typically depends on the duration of the base station covering the respective tracking region. Due to this approach, it is enabled to broadcast the respective tracking area IDs just as long as the first beam coverage area covers a certain tracking region, e.g. in case the first base station moves relative to the respective tracking region.

Another embodiment provides a wireless communication system comprising at least a first terrestrial and/or non-terrestrial base station which is configured to generate one or more beams for covering at least the first beam coverage area. Here, the first base station is configured to broadcast at least to the first beam coverage area first tracking area ID belonging to a first tracking region or a list of tracking area IDs comprising a first tracking area ID belonging to a first tracking region and a second tracking area ID belonging to a second tracking region just during a limited predetermined first time period. This has the purpose to enable broadcasting the respective tracking area, just as long as the first beam coverage area covers a certain tracking region if the first base station moves relative to the tracking region.

According to embodiments, the first base station is configured to broadcast at least to a second beam coverage area another tracking area ID belonging to another tracking region during a limited predetermined second time period subsequent to the first time period and/or to adapt the list of tracking area IDs for the limited predetermined second time period subsequent to the first time period.

Here, the communication system comprises a core network controller configured to control the first base station with regard to the broadcasted tracking area ID and/or with regard to adapting the list of tracking area IDs.

According to embodiments, the instruction to adapt the list of tracking area IDs ahead of time can be performed by a defining validity time window informing for each list entry of the list of tracking area IDs for a simple list of tracking area IDs of the second time period may, according to embodiments, comprise the second tracking area ID belonging to the second tracking region and a third tracking ID belonging to a third tracking region. In such a case, the recent coverage area for this second time period may cover an additional tracking region (here the third tracking region), but, for example, does not cover the first tracking region anymore. Thus, according to further embodiments, the list of tracking area IDs of the second time period comprises the second tracking area ID, but not the first tracking area ID. According to further embodiments, a list of tracking area IDs of the second time period comprises the third tracking area ID belonging to the third tracking region and a fourth tracking area ID belonging to a fourth tracking region.

According to further embodiments, the wireless communication system further comprises the user equipment. The user equipment is configured to receive the coverage beam and to determine its tracking region by comparing a tracking area ID assigned with the first and the second tracking area IDs of the received list.

The user equipment may be further configured
  to report a single tracking area ID to the core network controller, e.g. the first entry; and/or
  to report multiple tracking area IDs to the core network controller with or without the beam/satellite ID;
  to report intersecting tracking area IDs from multiple beams/satellites back to the core network controller;
  to report multiple tracking area IDs in combination with time information.

According to a further embodiment, the first base station is a moving or a fixed beam footprint LEO satellite or an Earth fixed beam footprint GEO satellite. The base station may, according to embodiments, comprise single/or multi-beam satellite functionality or may be a transparent or regenerative satellite. The first base station may—according to further embodiments—be a moving base station, e.g. a Drone or High-Altitude Platform. According to further embodiments, the wireless communication system is formed by a terrestrial network and/or a non-terrestrial network. Note, the wireless communication system supports heterogeneous networks.

According to further embodiments, the wireless communication system may comprise a second base station which is configured to broadcast at least to the first beam coverage area first tracking area ID belonging to a first tracking region or a list of tracking area IDs comprising a first tracking area ID belonging to a first tracking region and a second tracking area ID belonging to a second tracking region during a limited predetermined further time period.

Note that the first beam coverage area comprises during the above discussed first time period, i.e. temporarily, at least two tracking regions assigned to a fixed tracking area ID.

According to further embodiments, the wireless communication system is configured to route a paging message to one or more beams that currently (during their predetermined first time period) broadcast the first tracking area ID, if the paging message is dedicated to a user equipment within the first tracking region. Alternatively, it can route paging messages to the one or more beams that currently (during the predetermined first time period) broadcast the second tracking area ID, if the paging message is dedicated to a user equipment within the second tracking region. Here, the UEs expect to receive its paging messages in the beams with the tracking area IDs that are part of its tracking area.

Another embodiment provides a core network controller for the wireless communication system according to one of the previous claims, which is configured to control the first base station with regard to the broadcasted tracking area ID, with regard to the list of broadcasted tracking area IDs, with regard to adapting the broadcasted tracking area ID and/or with regard to adapting the list of tracking area IDs.

Note the core network controller may, according to further embodiments, be configured to re-paging messages to the one or more base stations selected by currently (e.g., during the predetermined first time period), broadcasting using one or more beams to the first tracking area IDs, if the paging messages are dedicated to a user equipment within the first tracking region and/or to the one or more base stations selected for currently broadcasting using one or more beams the second tracking area IDs if the paging message is dedicated to a user equipment within the second tracking region.

According to several embodiments, a user equipment is provided. The user equipment can be used in communication with the above discussed communication system and is configured to receive the coverage beam and the list broadcast using the coverage beam. Furthermore, the user equipment is configured to determine its tracking region by comparing a tracking area ID assigned to the user equipment with the tracking area ID comprised by the list.

According to further embodiments, the user equipment receiving another coverage beam, e.g. from another base station during another subsequent time period, the user equipment can determine its tracking region independently due to which base station the assigned tracking area ID or the list comprising the assigned tracking area ID has been received.

Another embodiment provides a method for localization management. The method comprises the step of broadcasting at least to the first beam coverage area—using a first terrestrial or non-terrestrial base station, the first base station generating one or more beams for covering a first beam coverage area—a list of tracking area IDs comprising a first tracking area ID belonging to a first tracking region and a second tracking area ID belonging to a second tracking region. This has the purpose to allow for the respective tracking area to be a subset of the first (recent) beam coverage area.

Another embodiment provides another method for localization management. This comprises the step of broadcasting at least to the first beam coverage area—using a first terrestrial or non-terrestrial base station, the first base station generating one or more beams for covering a first beam coverage area—first tracking area ID belonging to a first tracking region or a list of tracking area IDs comprising a first tracking area ID belonging to a first tracking region and a second tracking area ID belonging to a second tracking region just during a limited predetermined first time period. This has the purpose to enable to broadcast the respective tracking area IDs just as long as first beam coverage area covers a certain tracking region if the first base station moves relative to the tracking region. Another step refers to the broadcasting at least to the second beam coverage area—using a second terrestrial or non-terrestrial base station, the second base station generating one or more beams for covering a second beam coverage area—the first tracking area ID belonging to a first tracking region or another list of tracking area IDs comprising the first tracking area ID belonging to the first tracking region just during a limited predetermined second time period subsequent to the first time period.

Note that according to further embodiments, the method may further comprise the step of controlling the first base station with regard to the broadcasted tracking area ID and/or with regard to adapting the list of tracking area IDs.

Note, according to embodiments, the controlling is performed by defining the list of tracking area IDs for the first time period and another list of tracking area IDs for the second time period or by adapting the list of tracking area IDs ahead of time/for the second time period or by defining validity time window information for each list entry of list of tracking area IDs.

According to further embodiments the method may be implemented by a computer program. Therefore, this embodiment refers to a computer-readable digital storage medium.

With respect to FIG. 4 an approach for tracking management reduced to basic features will be discussed.

Figure 4:
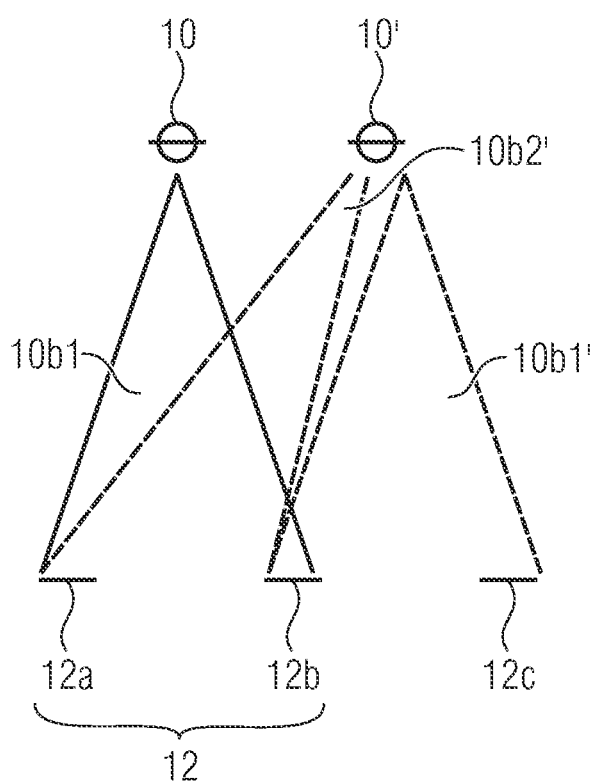
FIG. 4 shows a schematic illustration for discussing a basic embodiment for a localization management.

FIG. 4 shows a communication network having a non-terrestrial base station 10, here a satellite which generates at least one beam 10$b$1 covering a so-called first beam coverage area. This first beam coverage area 12 comprises two subportions 12$a$ and 12$b$. A third subportion 12$c$ is not in coverage of this beam 10$b$1. The first subportion 12$a$ is also referred to a first tracking region 12$a$, while the second portion is referred to as second tracking region 12$b$. Within in the first tracking region 12$a$ a user equipment 14 is arranged.

The user equipment 14 has, for example, an information regarding a so-called first tracking area ID. As long as the user equipment 14 receives this first tracking area ID, it knows that it is still within the same tracking region.

According to this embodiment, the first tracking area ID is received as part of a list comprising a plurality of tracking area IDs belonging to all tracking regions 12$a$ and 12$b$ which are at least at the current time period (first time period) covered by the beam 10$b$1. Consequently, the list as it is broadcasted by the satellite 10 comprises the tracking area IDs belonging to the first and the second tracking regions 12$a$/12$b$.

By now the first beam coverage area of the satellite changes, e.g. due to a movement of the satellite (cf. satellite 10'), it can happen that the second beam coverage area 10$b$1' does not cover all previous tracking regions anymore. This is the case as illustrated, since the beam 10$b$1' just covers the second tracking region 12$b$ and the third tracking region 12$c$. As a result of the shifted coverage area at least comprising the tracking area IDs are updated such that just the second tracking area ID and a third tracking area ID belonging to the third tracking region 12$c$ is comprised by the list broadcasted by the satellite 10'.

When now looking at the user equipment 14, it does not receive the expected tracking area ID anymore. However, it might happen that now another satellite or another beam of the satellite 10' covers the first tracking region 12$a$. This is the exemplary case which is illustrated here. According to embodiments, the satellite 10' broadcasted a list by use of the beam 10$b$2' which comprises the first tracking area ID, at least starting with the changed first and second beam coverage areas. From the point of view of the user equipment 14, it is realized that the same still receives the first tracking area ID so that for this UE the same tracking mechanism as discussed with respect to strictly terrestrial networks can be used. This leads to the advantage that the definition of the tracking area (TA) as non-overlapping areas on the ground is still valid and the current paging mechanism can be reused. The background thereof is that instead of broadcasting a single TAI, the base station/satellite shall be able to broadcast a list of TAIs of covered TAs, in order to allow for TAs to be a subset of the satellite beam coverage area. The base station/satellite should then adopt the list of TAIs with respect to its coverage area/beam footprint on Earth. In case of transparent satellites, the CN needs to instruct the satellite/NTN gateway to change the list of TAIs to be broadcast by the satellites either in time or ahead of time. In case of regenerative satellites, the CN may also instruct the satellite directly either in time or ahead of time. The instruction to adapt the TAI list broadcast ahead of time could be realized for example using validity time window information for each TAI list entry. Other options are not precluded. Further options are given in [4]. The options in [4] are specified for the UE, but can be applied for satellites also, which is proposed with this solution.

Note that in the presence of high mobility (UE/satellites) high signaling will occur with current terrestrial SotA location management due to frequent location list updates caused by non-stationary base stations. On the other hand, SotA LM solutions of satellite systems may use higher complexity at the user terminal for the GNSS capability. In the following we present a location management solution without GNSS information, which relies on the broadcast of multiple time varying IDs.

According to embodiments, a registration area can comprise one or more tracking areas (cf. 12a, 12b and 12c). Note, according to embodiments, a tracking area may be an area that is smaller than the coverage area of the base station/satellite.

Different approaches will be discussed below, based on which the user equipment can use the traffic area information.

According to embodiments, the UE reports a single TAI back to the CN, e.g. the first entity.

According to further embodiments, the UE reports multiple TAIs back to the CN with or without the beam/satellite ID.

According to further embodiments, the UE reports intersecting TAIs to multiple beams/satellites back to the CN. This is beneficial since a most precise position determination can be performed.

According to further embodiments the UE reports multiple TAIs in combination with time information. Background thereof is that typically the TAIs are only broadcasted during a certain time period by a respective satellite before the same TAI is broadcasted by another satellite or another beam.

With respect to FIGS. 5a and 5b an application of the above described tracking area management used for paging a non-terrestrial (or terrestrial) network will be described.

Figure 5A:
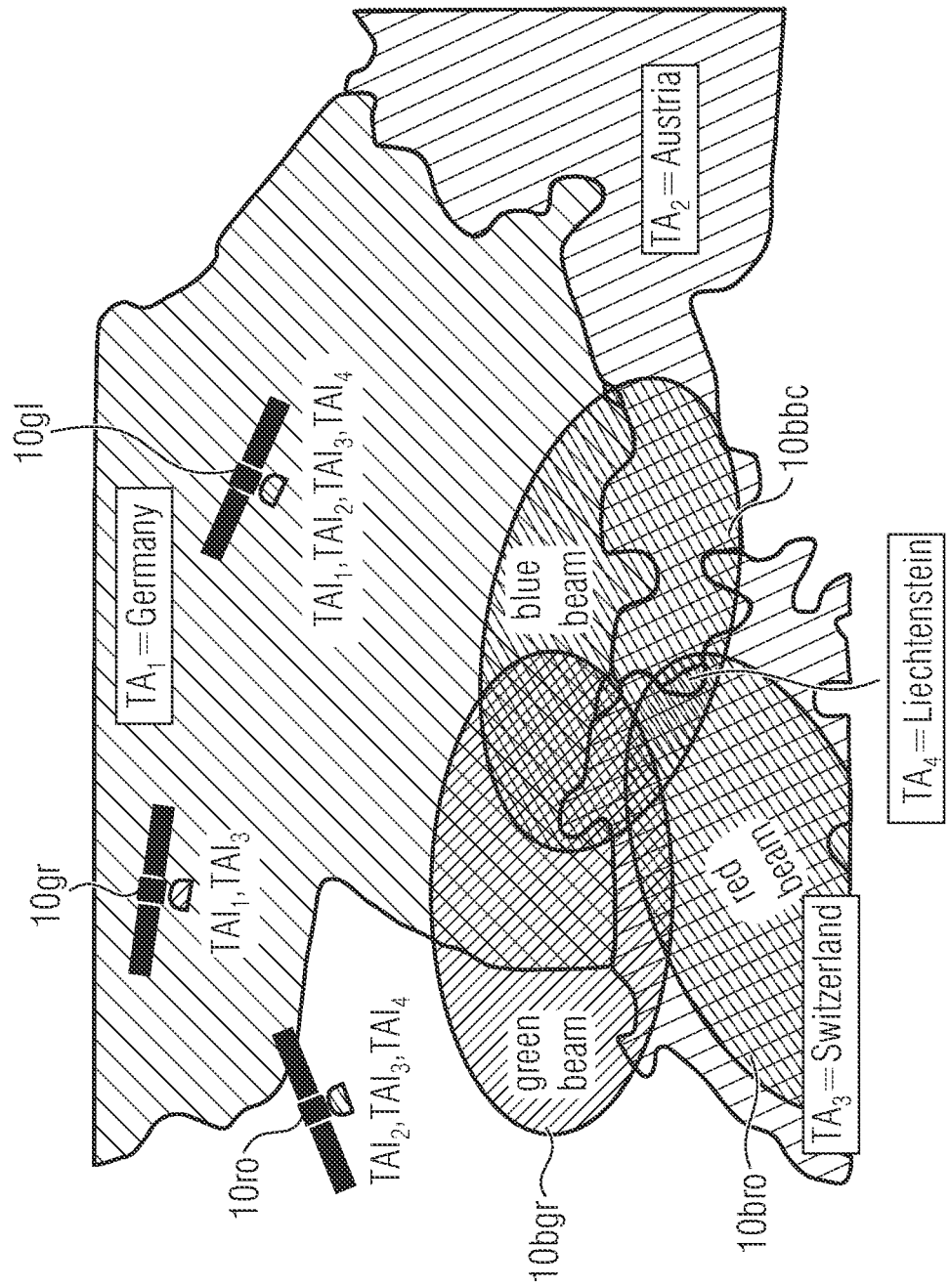
Figure 5B:
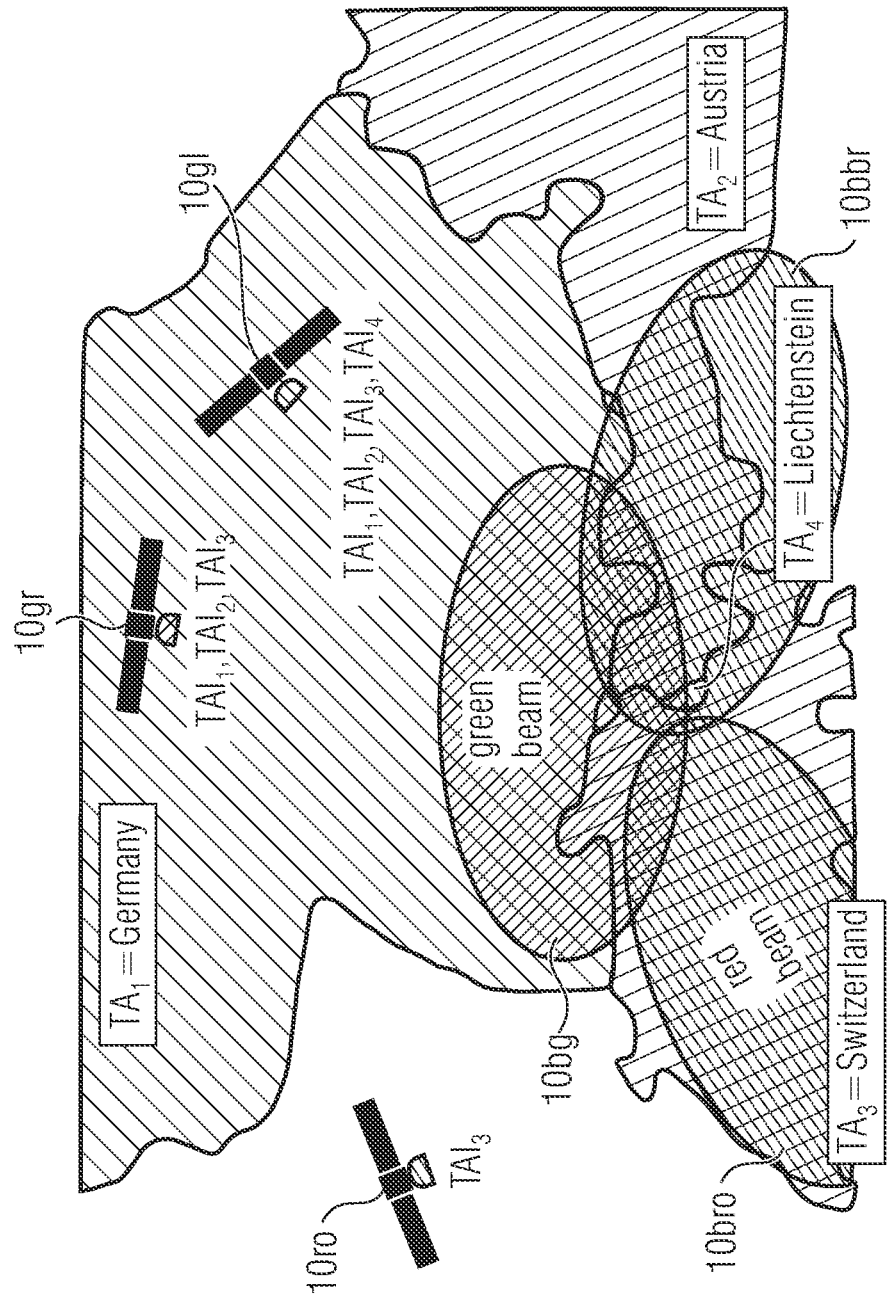

FIG. 5a shows a map of the area between Switzerland, Germany, Austria including Liechtenstein. These exemplary countries are in this embodiment equivalent to tracking areas. The following four TAIs are defined: $TA_1$: Germany, $TA_2$: Austria, $TA_3$: Switzerland and $TA_4$: Liechtenstein. Note that it is also possible to define multiple tracking areas per country. Three satellites 10ro, 10gr and 10bl are covering parts of the area as shown by the beam 10bro, 10bgr and 10bbl. In FIG. 5a the satellite 10ro broadcasts three TAIs, i.e. $TAI_2$, $TAI_3$, and $TAI_4$ as its beam footprint is covering $TA_2$, $TA_3$ and $TA_4$. Similar, the satellite 10r broadcasts $TAI_1$, $TAI_2$, while the satellite 10bl broadcasts $TAI_1$, $TAI_2$, $TAI_3$, and $TAI_4$. With FIG. 5b illustrating a second point of time, e.g. subsequent to the point of time as illustrated by 5a, the satellite has moved and the coverage areas 10bgr, 10bro and 10bbl have been shifted also. This change is represented by the list comprising the tracking area IDs. For example, the list as broadcasted by 10ro, just comprises $TAI_3$, the list as broadcasted by 10gr comprises $TAI_1$, $TAI_2$, and $TAI_3$, wherein the list broadcasted by the satellite 10bl stays the same.

Figure 6:
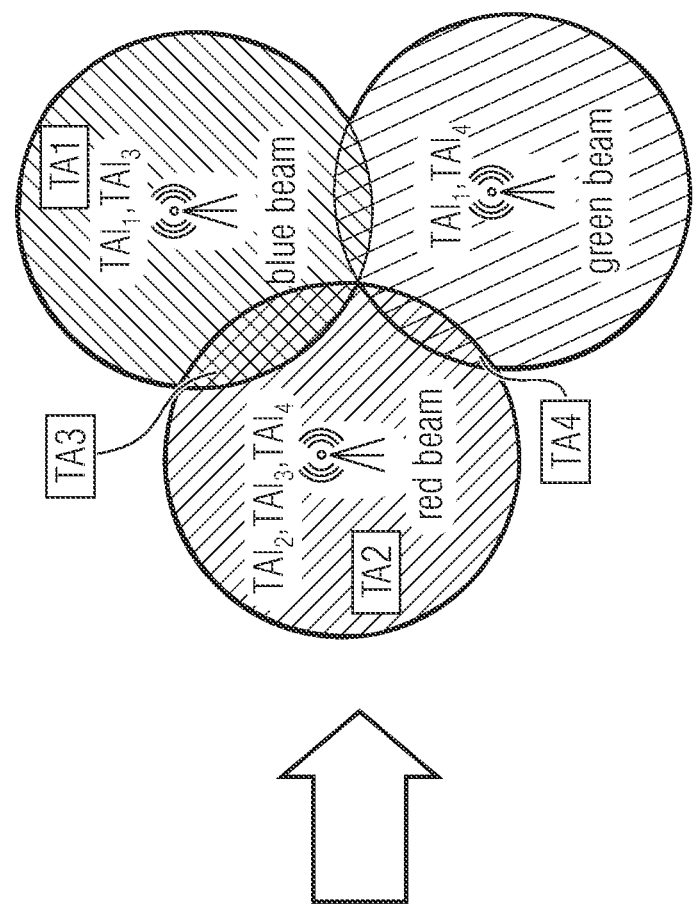
FIG. 6 shows schematically an illustration of the solution applied in terrestrial networks according to embodiments.
Figure 6:
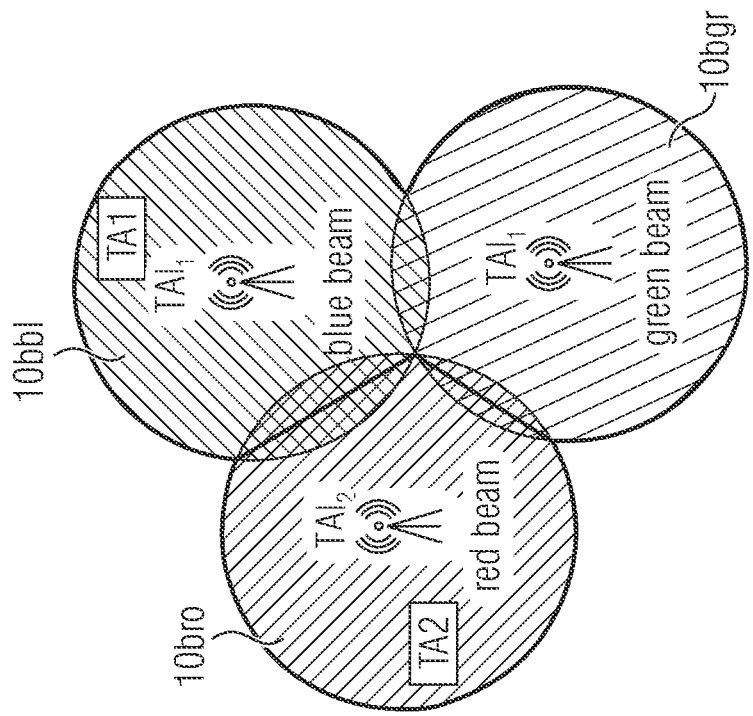

The above embodiment enables that just within a position being in coverage of a respective beam 10bgr, 10bro or 10bbl, the TAI belonging to the TA of the respective country can be received. Note, there is no difference between different positions within the beams 10bgr, 10bro or 10bbl. According to another embodiment, which is illustrated by FIG. 6, a determination can be made more precisely. FIG. 6 illustrates an exemplary setup for terrestrial networks, where the cell edges get their own TAI assigned. This embodiment starts from the assumption that three coverage areas 10bgr, 10bro and 10bbl are covered by three base stations. These coverage areas 10bro, 10bbl and 10bgr have a respective overlap, within which the lists/TAIs received from at least two base stations can be received. This information can be used to define due to the different TAIs separate TAs, here $TA_3$ and $TA_4$ within the overlap region.

All embodiments have in common that the paging mechanism based on Tracking Areas can be reused with minor modifications. The UE does not need GNSS capabilities for paging. Hence this is especially attractive for low complexity UEs or UEs with high power constraints.

This concept applies to all possible systems with moving or Earth fixed beam footprint LEO satellites, GEO satellites, regardless whether these are single- or multispot beam satellites or whether these are transparent or regenerative satellites. It might also be beneficial for moving base stations, e.g. Drones, High Altitude Platforms (HAPS), and for terrestrial networks, e.g. in case of heterogeneous networks.

According to further embodiments, instead of broadcasting TAIs based on the satellite's coverage area, the satellite could simply broadcast an ID unique for the satellite beam. The UE could then report all received IDs back to the CN. Then the CN could assign a registration area for that UE by providing it with satellite beam IDs and time windows in which these satellite beams are covering the UE. This is described in [4].

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 7:
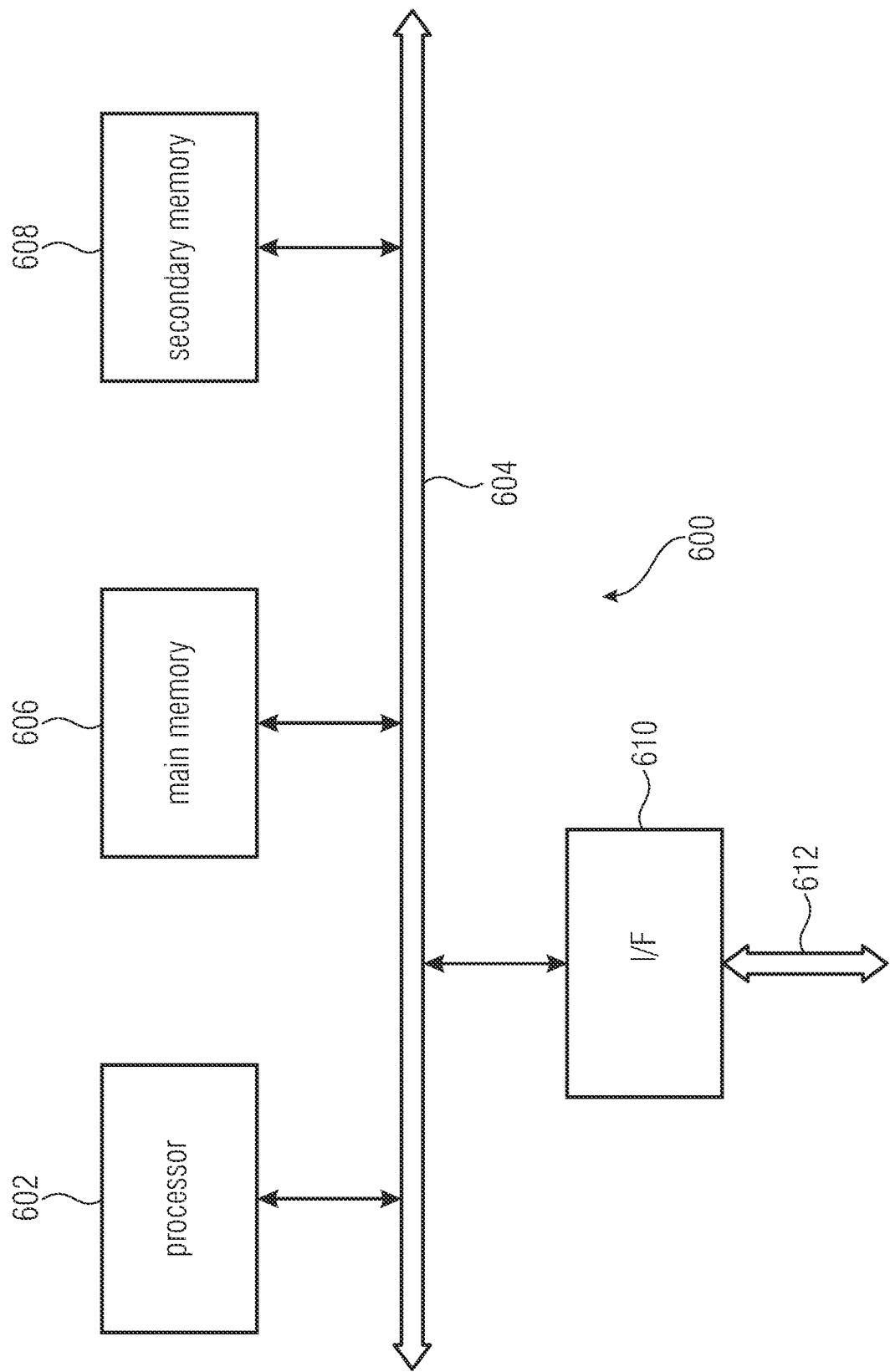
FIG. 7 shows a schematic block diagram for illustrating a processor which performs methods according to embodiments of the present invention.
Figure 8A:
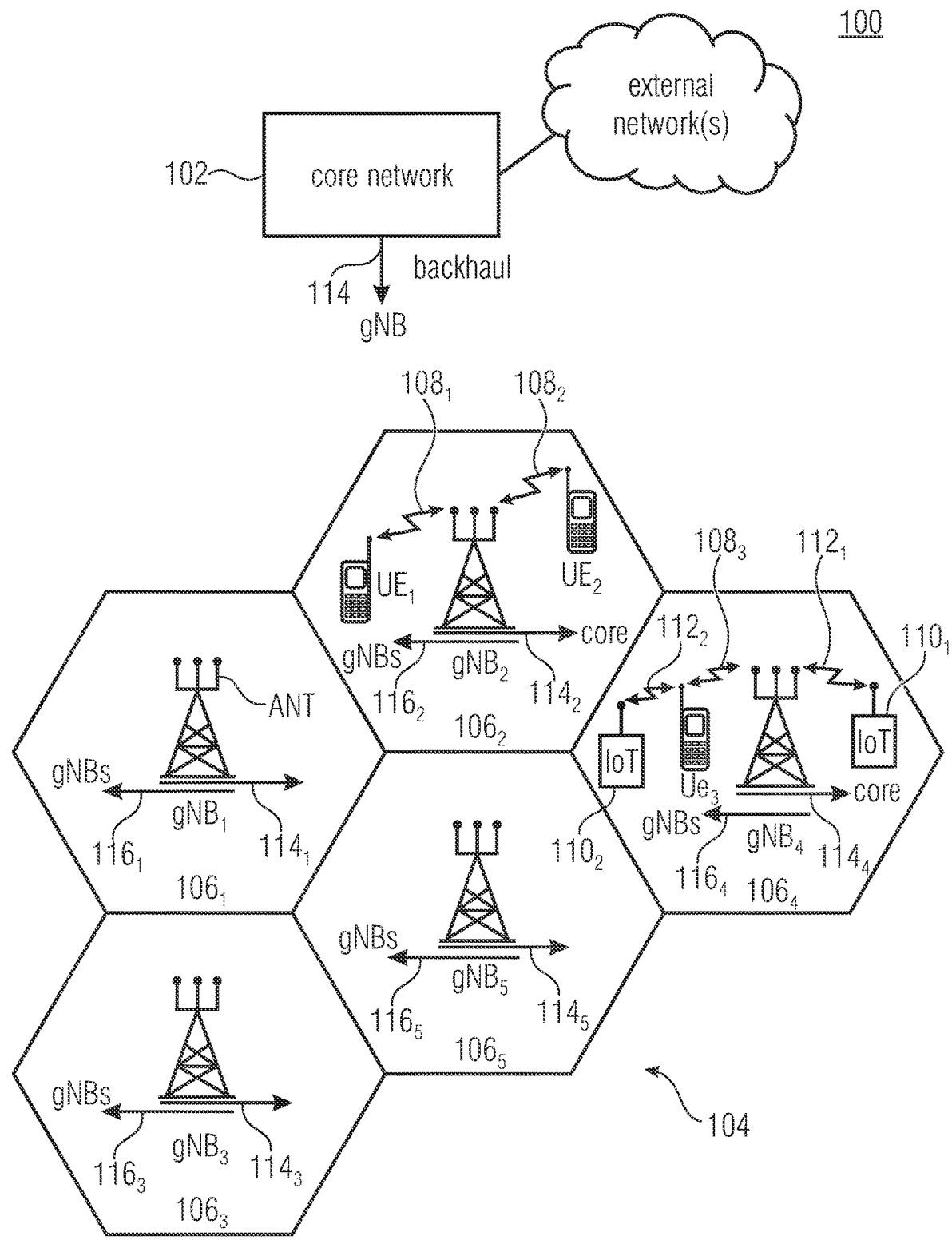
FIG. 8a, 8b show schematically an illustration of a terrestrial and a non-terrestrial network.
Figure 8B:
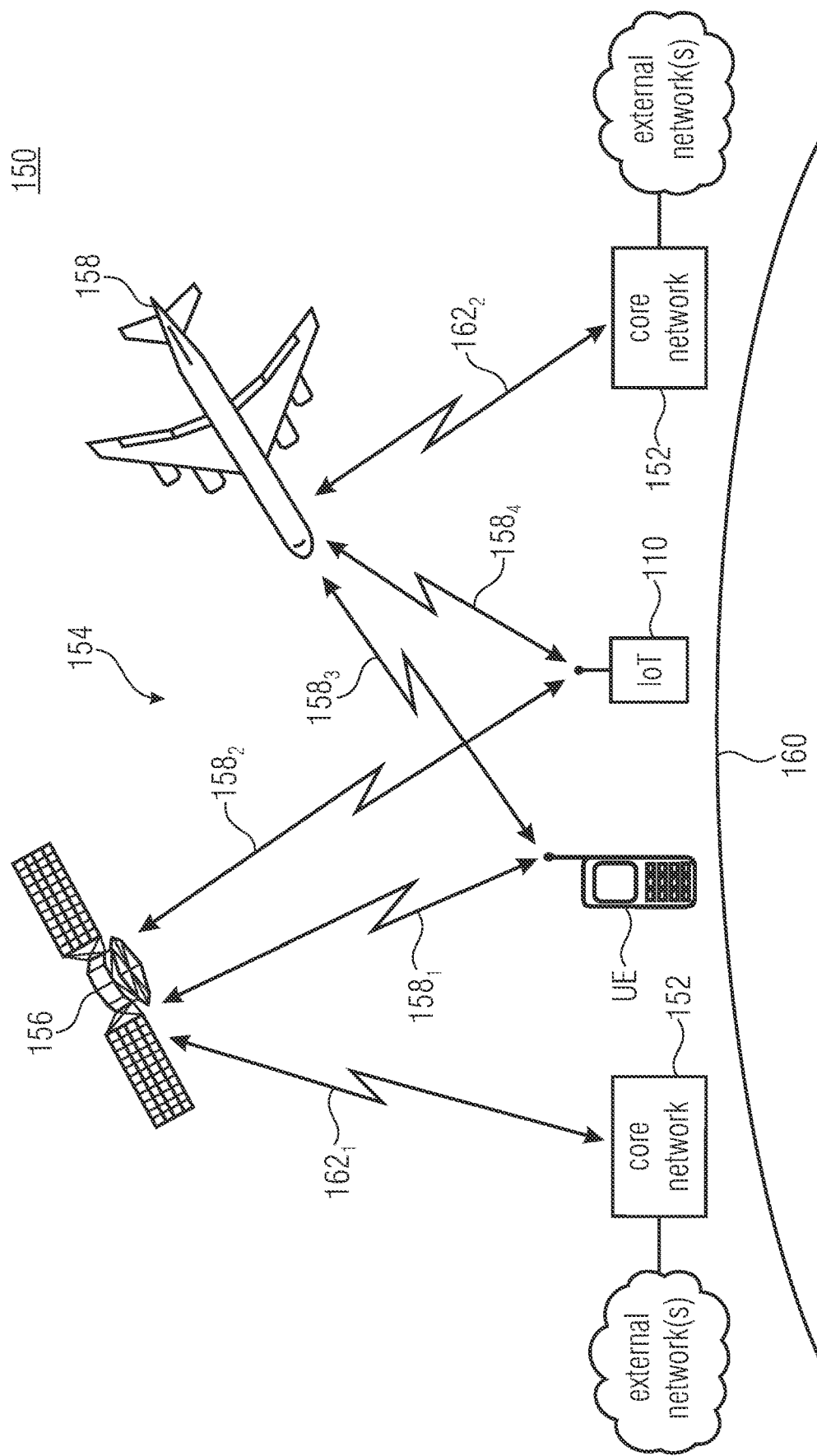

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer-readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer-readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

According to embodiments the wireless communication system may comprise a core network or a core network entity and a RAN network, like an AMF, the core network or the core network entity configured to page a UE in the wireless communication system only via those transmission points indicated in the UE's list.

According to embodiments the wireless communication system includes:
- a terrestrial network, or
- a non-terrestrial network, or
- networks or segments of networks using as a terminal an airborne vehicle or a spaceborne vehicle, or
- a combination thereof.

According to embodiments, the UE comprises one or more of
- a mobile terminal, or
- stationary terminal, or
- cellular IoT-UE, or
- vehicular UE, or
- an IoT or narrowband IoT, NB-IoT, device, or
- a ground based vehicle, or
- an aerial vehicle, or
- a drone, or
- a moving base station, or
- road side unit, or
- a building, or
- any other item or device provided with network connectivity enabling the item/device to communicate using the wireless communication network, e.g., a sensor or actuator.

According to embodiments, the transmission point comprises one or more of
- a macro cell base station, or
- a small cell base station, or
- a central unit of a base station, or
- a distributed unit of a base station, or
- a road side unit, or
- a UE, or
- a remote radio head, or
- an AMF, or
- an SMF, or
- a core network entity, or
- a network slice as in the NR or 5G core context, or
- a spaceborne vehicle, like a satellite or a space vehicles at a specific altitude and orbital period or plane, e.g., a low earth orbit (LEO), a medium earth orbit (MEO), a geosynchronous orbit (GSO), a geostationary orbit (GEO), or a high earth orbit (HEO), or
- an airborne vehicle, like an unmanned aircraft system (UAS), e.g., a tethered UAS, a lighter than air UAS (LTA), a heavier than air UAS (HTA) and a high altitude UAS platforms (HAPs), or any transmission/reception point, TRP, enabling an item or a device to communicate using the wireless communication network, the item or device being provided with network connectivity to communicate using the wireless communication network.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES AND ABBREVIATIONS

| Reference Label (use Word bookmarks) | Details |
|---|---|
| [1] | TR 38.811; Study on New Radio (NR) to support non-terrestrial networks |
| [2] | TS 38.300; Technical Specification Group Radio Access Network; NR; NR and NG-RAN Overall Description Stage 2 (Release 15) |
| [3] | TS 23.501 |
| [4] | EP18197386.8; Location Management with Dynamic TAL for High Mobility |
| [5] | TS 38.331; Technical Specification Group Radio Access Network; NR; Radio Resource Control (RRC) protocol specification (Release 15), v15.3.0 (2018-09) |

| Abbreviation | Meaning |
|---|---|
| BS | Base Station |
| CBR | Channel Busy Ratio |
| CN | Core Network |
| D2D | Device-to-Device |
| LA | Location Area |
| RAN | Radio Access Network |
| TA | Tracking Area |
| TAC | Tracking Area Code |
| TAI | Tracking Area ID |
| TAL | Tracking Area List |

The invention claimed is:

1. A wireless communication system comprising:
at least a first moving transmission point, the first moving transmission point configured to generate one or more beams for covering temporarily at least a first beam coverage area which is dynamically arranged to ground and which is subdivided into a first tracking region and a second tracking region;
wherein the first moving transmission point is configured to broadcast at least to the first beam coverage area a list of tracking area IDs comprising a first tracking area ID belonging to the first tracking region and a second tracking area ID belonging to the second tracking region just during a limited predetermined first time period;
wherein the list of tracking area IDs is updated from time to time, namely when the first tracking region and the second tracking region are not covered or served anymore by the first beam coverage area or when a third tracking region is covered or served by the first beam coverage area;
wherein the first moving transmission point is configured to broadcast at least to a second beam coverage area another tracking area ID belonging to another tracking region during a limited predetermined second time period subsequent to the first time period and/or to adapt the list of tracking area IDs for the limited predetermined second time period subsequent to the first time period; and
wherein the instruction to adapt the list of tracking area IDs ahead of time is performed by defining validity time window information for each list entry of tracking area IDs.

2. The wireless communication system according to claim 1, wherein the communication system comprises a core network controller configured to control the first moving transmission point with regard to the broadcasted tracking area ID and/or with regard to adapting the list of tracking area IDs.

3. The wireless communication system according to claim 1, wherein the list of tracking area IDs of the second time period comprises the second tracking area ID belonging to the second tracking region and a third tracking area ID belonging to a third tracking region; and/or
wherein the list of tracking area IDs of the second time period comprises the second tracking area ID belonging to the second tracking region, but not the first tracking area ID belonging to a first tracking region; and/or
wherein the list of tracking area IDs of the second time period comprises the third tracking area ID belonging to a third tracking region and a fourth tracking area ID belonging to a fourth tracking region.

4. The wireless communication system according to claim 1, further comprising a user equipment being configured to receive the coverage beam and to determine its tracking region by comparing a tracking area ID assigned with the first and second tracking area IDs of the received list.

5. The wireless communication system according to claim 4, wherein the equipment is configured
to report a single tracking area ID to the core network controller, e.g. the first entry; and/or
to report UE reports multiple tracking area IDs to the core network controller with or without the beam/satellite ID;
to report intersecting tracking area IDs from multiple beams/satellites back to the core network controller;
to report multiple tracking area IDs in combination with time information.

6. The wireless communication system according to claim 1, wherein first moving transmission point is a moving or Earth fixed beam footprint LEO satellite or an Earth fixed beam footprint GEO satellite, and/or
wherein first moving transmission point comprises single or multispot beam satellite or transparent or regenerative satellite; or
wherein first moving transmission point is a moving moving transmission point e.g. a Drone or High-Altitude Platform; or
wherein the wireless communication system is formed by a terrestrial network and/or wherein the wireless communication system supports heterogeneous networks.

7. The wireless communication system according to claim 1, wherein the communication system comprises a second moving transmission point which is configured to broadcast at least to the first beam coverage area, the first tracking area ID belonging to a first tracking region or a list of tracking area IDs comprising a first tracking area ID belonging to a first tracking region and a second tracking area ID belonging to a second tracking region during a limited predetermined further time period.

8. The wireless communication system according to claim 1, wherein the first beam coverage area comprises at least during the first time period at least two tracking regions, each assigned to a fixed tracking area ID.

9. The wireless communication system according to claim 1, wherein a wireless communication system routes a paging message to the one or more beams that currently broadcast the first tracking area ID if the paging message is dedicated to a user equipment within the first tracking region, and/or routes paging messages to the one or more beams that currently broadcast the second tracking area ID if the paging message is dedicated to a user equipment within the second tracking region.

10. A core network controller for the wireless communication system according to claim 1, which is configured to control the first moving transmission point with regard to the broadcasted tracking area ID, with regard to the list of broadcasted tracking area IDs, with regard to adapting the broadcasted tracking area ID and/or with regard to adapting the list of tracking area IDs.

11. A core network controller for the wireless communication system A according to claim 1, the core network controller being configured to route paging messages to the one or more moving transmission points selected for currently broadcasting using one or more beams the first tracking area ID if the paging message is dedicated to a user equipment within the first tracking region and/or to the one or more moving transmission points selected for currently broadcasting using one or more beams the second tracking area ID if the paging message is dedicated to a user equipment within the second tracking region.

12. The wireless communication system of claim 1,
wherein the user equipment comprises one or more of
a mobile terminal, or
stationary terminal, or
cellular IoT-UE, or
vehicular UE, or
an IoT or narrowband IoT, NB-IoT, device, or
a ground based vehicle, or
an aerial vehicle, or
a drone, or
a moving base station, or
road side unit, or
a building, or
any other item or device provided with network connectivity enabling the item/device to communicate using the wireless communication network, e.g., a sensor or actuator, and/or
wherein the terrestrial or non-terrestrial moving transmission point comprises one or more of
a macro cell base station, or
a small cell base station, or
a central unit of a base station, or
a distributed unit of a base station, or
a road side unit, or
a UE, or
a remote radio head, or
an AMF, or
an SMF, or
a core network entity, or
a network slice as in the NR or 5G core context, or
a spaceborne vehicle, like a satellite or a space vehicles at a specific altitude and orbital period or plane, e.g., a low earth orbit, a medium earth orbit, a geosynchronous orbit, a geostationary orbit, or a high earth orbit, or
an airborne vehicle, like an unmanned aircraft system, e.g., a tethered UAS, a lighter than air UAS, a heavier than air UAS and a high altitude UAS platforms, or
any transmission/reception point, TRP, enabling an item or a device to communicate using the wireless communication network, the item or device being provided with network connectivity to communicate using the wireless communication network.

13. The wireless communication system of claim 1, comprising a core network or a core network entity and a RAN network, like an AMF, the core network or the core network entity configured to page a UE in the wireless communication system only via those transmission points indicated in the UE's list; and/or
wherein the wireless communication system comprises
a terrestrial network, or
a non-terrestrial network, or
networks or segments of networks using as a terminal an airborne vehicle or a spaceborne vehicle, or
a combination thereof.

14. A user equipment for the wireless communication system, wherein the wireless communication system comprising: at least a first moving transmission point, the first moving transmission point configured to generate one or more beams for covering temporarily at least a first beam coverage area which is dynamically arranged to ground and which is subdivided into a first tracking region and a second tracking region; wherein the first moving transmission point is configured to broadcast at least to the first beam coverage area a list of tracking area IDs comprising a first tracking area ID belonging to the first tracking region and a second tracking area ID belonging to the second tracking region; wherein the list of tracking area IDs is updated from time to time, namely when the first tracking region and the second tracking region are not covered or served anymore by the first beam coverage area or when a third tracking region is covered or served by the first beam coverage area:
wherein the user equipment is configured to receive the coverage beam and the list broadcasted using the coverage beam and to determine its tracking region by comparing a tracking area ID assigned to the user equipment with the tracking area IDs comprised by the list, wherein the user equipment is configured for receiving another coverage beam from another moving transmission point during another subsequent time period, wherein the user equipment is configured to determine its tracking region independently due to which moving transmission point the assigned tracking area ID or the list comprising the assigned tracking area ID has been received.

15. A method for location management, the method comprises:
broadcasting at least to the first beam coverage area—using a first non-terrestrial moving transmission point, the first moving transmission point generating one or more beams for covering temporarily a first beam coverage area which is dynamically arranged to ground and which is subdivided into a first tracking region and a second tracking region (12b)—a list of tracking area IDs comprising a first tracking area ID belonging to the first tracking region and a second tracking area ID belonging to the second tracking region just during a limited predetermined first time period; and/or
broadcasting at least to the second beam coverage area—using a second non-terrestrial moving transmission point, the second moving transmission point generating one or more beams for covering temporarily a second beam coverage area—another list of tracking area IDs comprising the first tracking area ID belonging to the first tracking region just during a limited predetermined second time period subsequent to the first time period; and updating the list of tracking area IDs from time to time, namely when the first tracking region and the second tracking region are not covered or served anymore by the first beam coverage area or when a third tracking region is covered or served by the first beam coverage area;

broadcasting at least to a second beam coverage area another tracking area ID belonging to another tracking region during a limited predetermined second time period subsequent to the first time period and/or to adapt the list of tracking area IDs for the limited predetermined second time period subsequent to the first time period; and wherein the instruction to adapt the list of tracking area IDs ahead of time is performed by defining validity time window information for each list entry of list of tracking area IDs.

16. The method for location management according to claim 15, further comprising controlling the first moving transmission point with regard to the broadcasted tracking area ID and/or with regard to adapting the list of tracking area IDs.

17. The method for location management according to claim 16, wherein the controlling is performed by defining the list of tracking area IDs for the first time period and another list of tracking area IDs for the second time period or by adapting the list of tracking area IDs ahead of time/for the second time period or by defining validity time window information for each list entry of list of tracking area IDs.

18. A non-transitory digital storage medium having a computer program stored thereon to perform the method for location management, the method comprising:

broadcasting at least to the first beam coverage area—using a first non-terrestrial moving transmission point, the first moving transmission point generating one or more beams for covering temporarily a first beam coverage area which is dynamically arranged to ground and which is subdivided into a first tracking region and a second tracking region (12*b*)—a list of tracking area IDs comprising a first tracking area ID belonging to the first tracking region and a second tracking area ID belonging to the second tracking region just during a limited predetermined first time period; and/or broadcasting at least to the second beam coverage area—using a second non-terrestrial moving transmission point, the second moving transmission point generating one or more beams for covering temporarily a second beam coverage area—another list of tracking area IDs comprising the first tracking area ID belonging to the first tracking region just during a limited predetermined second time period subsequent to the first time period; and updating the list of tracking area IDs from time to time, namely when the first tracking region and the second tracking region are not covered or served anymore by the first beam coverage area or when a third tracking region is covered or served by the first beam coverage area, broadcasting at least to a second beam coverage area another tracking area ID belonging to another tracking region during a limited predetermined second time period subsequent tot the first time period and/or to adapt the list of tracking area IDs for the limited predetermined second time period subsequent to the first time period; and wherein the instruction to adapt the list of tracking area IDs ahead of time is performed by defining validity time window information for each list entry of list of tracking area IDs;

when said computer program is run by a computer.

\* \* \* \* \*